Figure 1A:
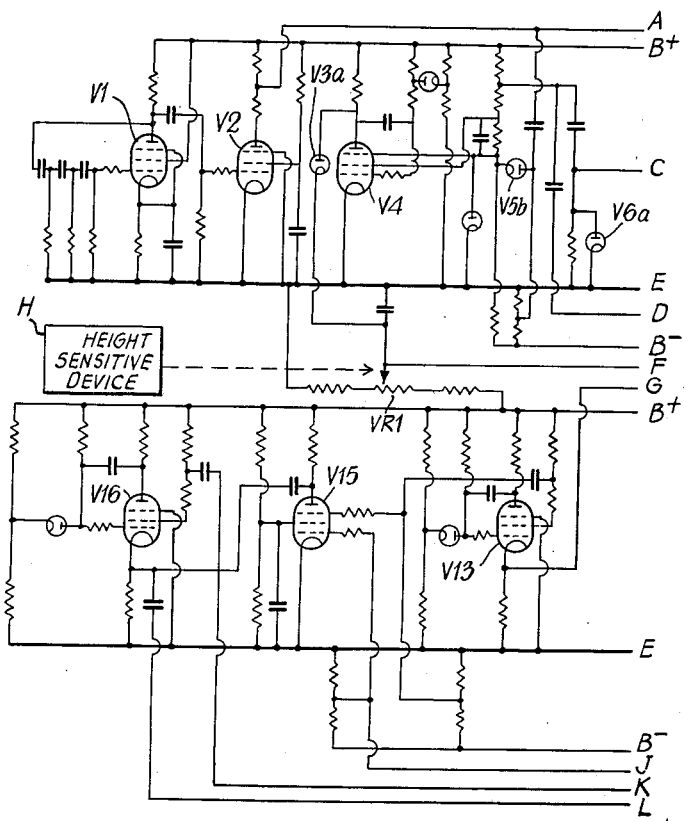

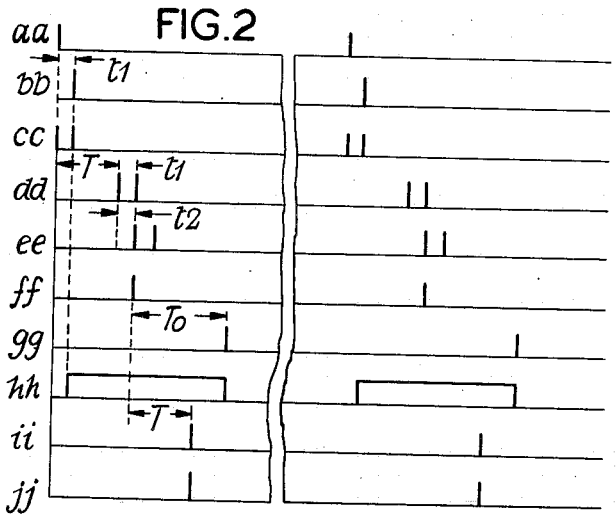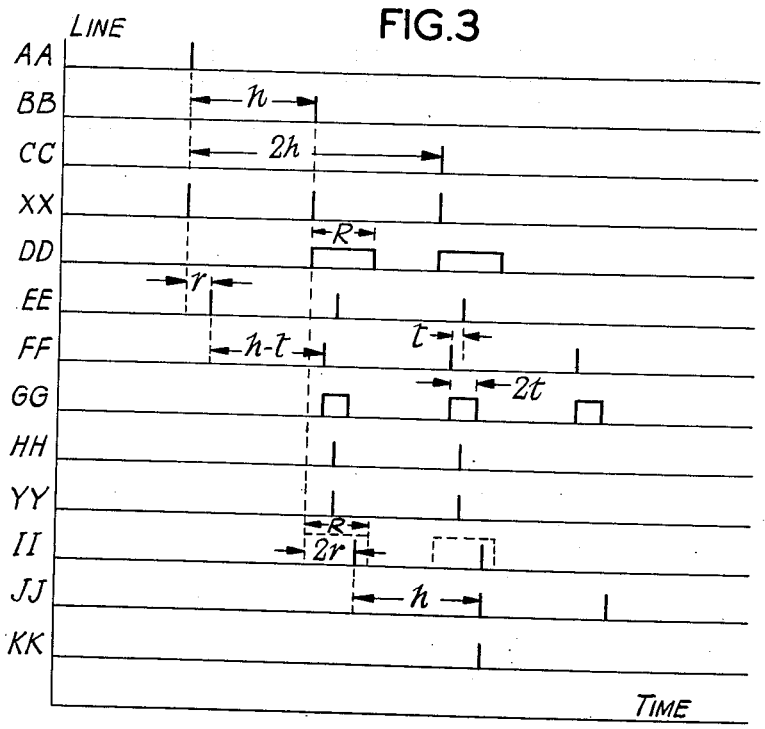

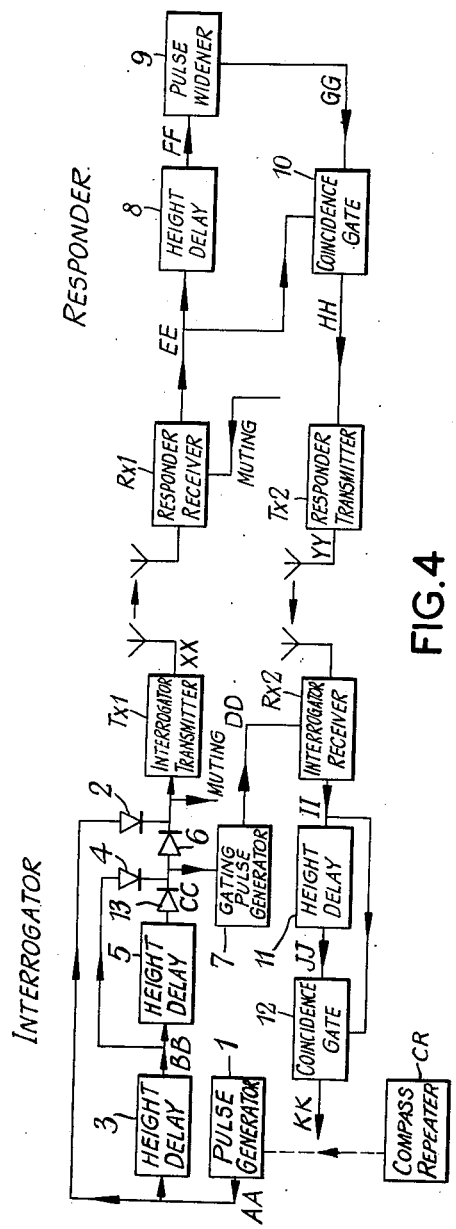

3,035,260
Patented May 15, 1962

1

3,035,260
RANGE MEASURING DEVICES
Harold Philip Freedman, Twickenham, England, John Vielle, Tangier, Morocco, and Rudolf Arnold Wiersma, Kingston-on-Thames, England, assignors to Avel Corporation Geneva, Geneva, Switzerland
Filed Feb. 9, 1959, Ser. No. 791,924
Claims priority, application Great Britain Feb. 12, 1958
2 Claims. (Cl. 343—6.5)

This invention concerns proximity warning devices.

In the co-pending applications Nos. 690,377, now Patent No. 2,980,908 issued on April 18, 1961; 690,367, now abandoned; 690,366, there was disclosed a general schematic arrangement for deriving the range of an intruding aircraft or ship in order to determine or help to determine whether there is any probability of a collision. It is the object of the present invention to provide a ranger mechanism more particularly adapted for use with aircraft and wherein the height of the aircraft is used as a controlling factor in the measurement of the range in order that if the intruding aircraft is at a substantially different height no signals will be derived from the ranger mechanism to denote that it is too close.

According to this invention, the apparatus is characterised in that it comprises means whereby at least two pulses are transmitted by the first station at a spacing indicative of the height of such first station, such pulses being receivable by the second station to initiate a re-transmission and such re-transmission being made by the second station only if the spacing of the transmitted pulses is characteristic of the height of the second station, means being provided in the first station to receive such re-transmission.

The present invention makes use of interrogator techniques, wherein each aircraft carries an interrogator transmitter and receiver and also a responder transmitter and receiver.

If the interrogation and response are made on different frequencies in the well-known manner, each aircraft may carry two transmitters and two receivers. Alternatively by use of frequency shift keying techniques, one transmitter and one receiver may be used for both frequencies. Furthermore it is possible, by time sharing techniques to use the same frequency for interrogation and response, again requiring only one transmitter and one receiver in each aircraft. However, for the sake of convenience the present invention will be described with reference to a system in which the interrogators operate upon one frequency, hereinafter called "frequency X," whilst the responders operate upon a different frequency, hereinafter called "frequency Y," and throughout the specification and claims the two transmitters and two receivers will be described and claimed as separate items, although it must be clearly understood that they may be combined as above described.

In the simplest form of the invention, the interrogator transmitter generates and transmits a pair of pulses which are separated by a delay representing the height of the interrogator and these are received by the responder receiver. In the responder receiver, both pulses are delayed by an amount dependent upon the height of the responder and then the four pulses thus existing are compared for coincidence which should take place, if the two aircraft are at the same height, between the second transmitted pulse and the first delayed pulse. If there is this coincidence, a single pulse is generated and transmitted from the responder transmitter and is received by the interrogator receiver. The fact that it is received indicates that the two aircraft are at the same height and then the delay before this pulse is received,

2 representing the range between the two aircraft, determines whether the pulse is accepted or rejected.

In a slightly more complex system, the interrogation consists of three pulses separated by equal amounts each indicative of the height of the aircraft carrying the interrogator and the system operates as before except that, of course, the reply that the interrogator receives will be a pair of pulses, and this pair of pulses is examined to see if the separation is exactly the same as the separation of the initially transmitted pulses. The object of this is to ensure as far as possible that the response received by the interrogator is in reply to an interrogation that originated from that aircraft and from no other aircraft.

In the preferred arrangement, the delay before a pulse is received is considered only from the point of view as to whether it is more or less than a pre-set delay; thus the range is measured only to the extent of determining whether it is greater or less than a pre-set range. But it is obvious that the actual delay time can be measured to determine the actual range of the intruding aircraft, ranges greater than a pre-set figure again preferably being ignored.

The precise form of the height coding is, of course, not significant but, for the sake of example only, in this application it will be considered that the delay between the two pulses is a measure of the height above sea level. In a preferred arrangement, the height coding is based upon the ambient atmospheric pressure at the aircraft.

Figure 1A:
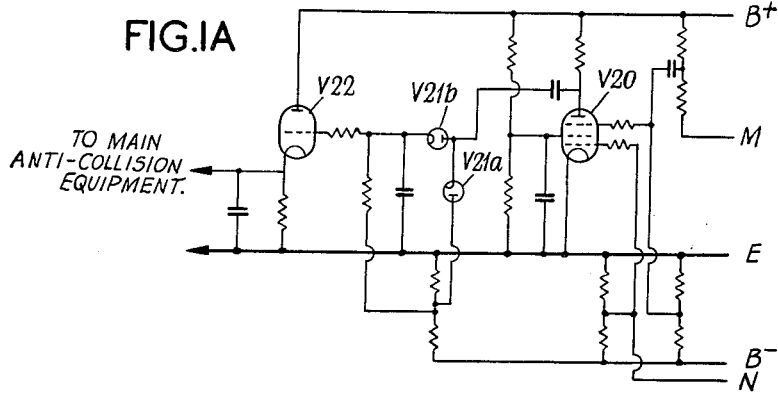
Figure 1B:
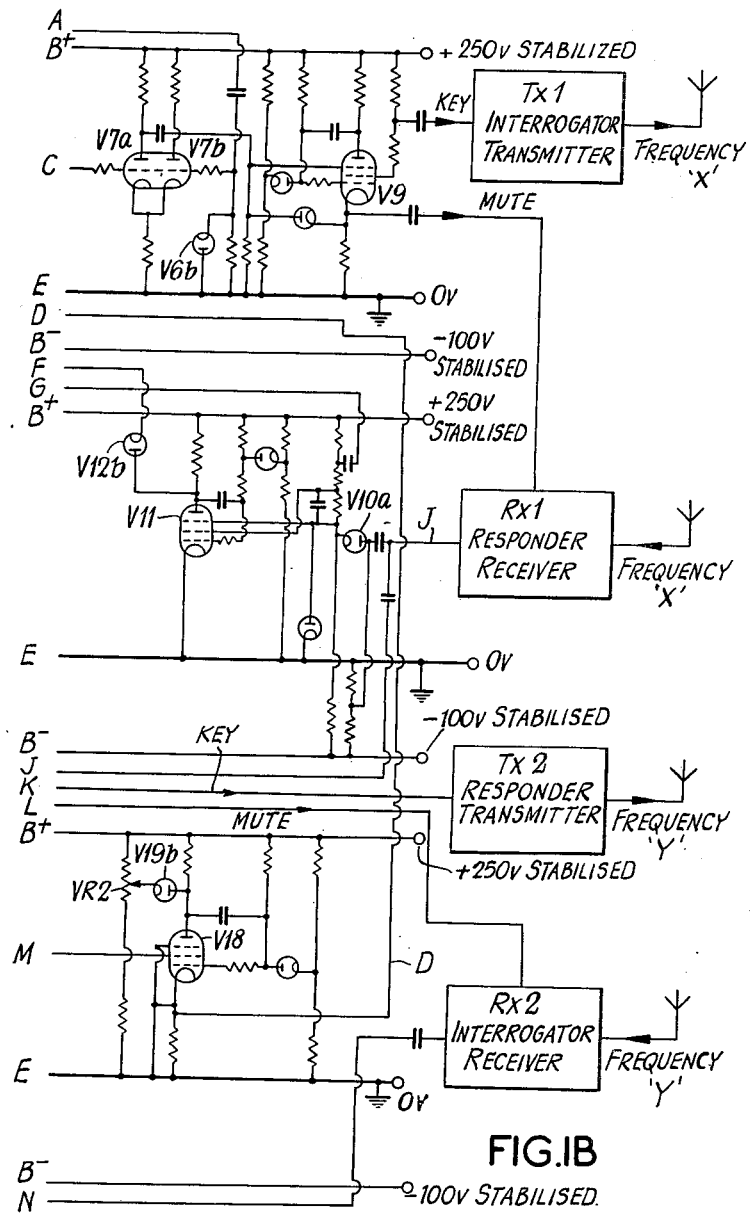

In order that the invention may more readily be understood, certain embodiments of the same will now be described with reference to the accompanying drawings, in which:

FIGURES 1A and 1B are a circuit diagram of the relevant parts of the apparatus;
FIGURE 2 is a diagram of the pulse pattern;
FIGURE 3 is a pulse diagram associated with an alternative form of apparatus; and
FIGURE 4 is a block diagram of such alternative form of apparatus.

Referring now to FIGURES 1A and 1B of the drawings it will be seen that the main transmitters and receivers are not shown in detail but are indicated as blocks. A sine wave oscillator having a resistance-capacity input to a valve V1 passes an output at approximately 100 cycles per second to a valve V2 which acts to provide a square wave. This square wave output is differentiated to provide positive- and negative-going spikes and the positive-going spikes are applied to the suppressor grid of a screen-coupled precision phantastron V4 through a coupling diode V5b. The initial anode voltage of the phantastron V4 is determined via a diode V3a and a precision potentiometer VR1 which has its slider controlled by a height sensitive unit H. The negative-going spikes are suppressed by the diode V5b.

The arrival of a positive spike at the suppressor grid of the phantastron V4 causes the anode voltage of this valve to drop in a linear manner due to the Miller effect. At the same time the screen voltage rises rapidly, bringing the suppressor grid up to earth potential, and the screen grid remains substantially at a steady voltage until the anode bottoms, the delay before this happens being determined by the initial anode voltage as set by VR1. As soon as the anode bottoms the control grid voltage rises sharply and the screen grid voltage drops. By differentiating the screen grid voltage change a negative spike is produced on line C which is fed to the grid of a triode valve V7a, see FIGURE 1B. This negative spike is delayed as compared with the original positive spike by a time which is dictated by the potentiometer VR1 and which may be, for example, of the order of 40 to 1,000 microseconds. The negative spike on the grid of the valve V7a produces a positive spike at the anode.

The original positive spike is also fed via line A to the grid of a triode valve V7b and since the cathodes of the valves V7a and V7b are directly coupled this produces a positive spike at the anode of the valve V7a. Diodes V6a and V6b suppress the unwanted spikes.

It will be clear that the output from the valve V7a is a pair of positive spikes spaced by the necessary time which is characteristic of height of the aircraft and these two spikes are fed to the suppressor grid of a valve V9 which is connected as a cathode-coupled phantastron. Each spike causes a run down of anode voltage similar to that described taking approximately 20 microseconds and in each case the screen voltage juumps to a higher value where it remains for this period of 20 microseconds before dropping to its original value. The change of the screen grid voltage, i.e. a pair of positive pulses each 20 microseconds long, is used to key on an interrogator transmitter Tx1.

The cathode voltage also produces a pair of negative-going pulses each of 20 microseconds duration and which are used to mute a responder receiver Rx1.

It will be understood that the signal transmitted by the transmitter Tx1 on the frequency X comprises a pair of pulses each of 20 microseconds duration separated by an interval dependent upon height and that this pair of pulses is repeated every 10 milliseconds.

In the event that an interrogation is received by the aircraft whose apparatus is illustrated in the drawings this interrogation will be received at the frequency X by the responder receiver Rx1 and will be in the form of a pair of pulses each 20 microseconds long and separated by a delay which is characteristic of the height of the aircraft initiating the interrogation. The amplified and demodulated signals from the receiver Rx1 consist of a pair of positive pulses on a line J which are fed to a differentiatior circuit to provide positive and negative spikes of which the positive spikes are passed via a diode V10a to the suppressor grid of a screen-coupled phantastron V11. The first positive spike initiates a run down in anode voltage as previously described and the initial anode voltage of the phantastron V11 is set via a line F and a diode V12b from the potentiometer VR1. Hence, the length of the pulse produced by the phantastron V11 will be characteristic of the height and the output from this phantastron V11 is taken from the screen grid and is differentiated to produce a negative spike characteristic of the end of the pulse which is fed via a line G to the cathode of a cathode-coupled phantastron V13 (see FIGURE 1A). The phantastron V13 produces at its screen grid a positive pulse of 20 microsecond length which is fed directly to the suppressor grid of a gate valve V15. Thus the first signal appearing at the suppressor grid of the valve V15 is a positive-going pulse 20 microseconds long and which is subject to a delay which is characteristic of the height of the aircraft carrying the equipment.

The output from the responder receiver Rx1, before differentiation, is also passed by the line J to the control grid of the valve V15. Under normal circumstances both the suppressor grid and the control grid of the valve V15 are biassed by negative voltages obtained from the −100 volt B− line and hence anode current can flow only when both control and suppressor grids are provided at the same time with positive-going pulses. Thus if the received delay and the internal delay are the same (due to the two aircraft being at the same height) the first pulse applied to the suppressor grid of the valve V15 will coincide exactly with the second of each pair of pulses applied to the control grid of the same valve and a pulse of anode current exactly 20 microseconds long will flow. Clearly if the delays are not quite equal the pulse of anode current will be shorter, whereas if the heights are substantially different no coincidence will occur and there will be no anode current. If anode current flows, it will produce at the anode a negative-going pulse which is fed by a coupling capacitor to the cathode of a valve V16 which is connected as a cathode-coupled phantastron. The leading edge of the negative-going pulse initiates a run-down of anode voltage accompanied by a positive-going pulse 20 microseconds long at the screen grid; in this way any coincidence produces a standard pulse. This standard length pulse appears on a line K and is used to key a responder transmitter Tx2, operating on a frequency Y. Hence, a single pulse of frequency Y is produced in response to an interrogation by a pair of pulses if, and only if, the two aircraft are at substantially the same height. At the same time as the positive-going pulse is produced at the screen grid of the phantastron V16, a negative-going pulse of the same duration is produced at the cathode and this pulse appears on line L and is used to mute an interrogator receiver Rx2.

The apparatus described so far causes two aircraft to come into communication if they are substantially at the same height but it is desirable to ignore aircraft which are at a distance further than that considered dangerous. When the two aircraft are in communication, the interrogator receiver Rx2 receives single pulses of 20 microsecond length on a frequency Y. In order to determine if the range between the two aircraft is above or below a certain figure, the signals previously described in the screen circuit of the phantastron V4 are also fed via a line D to the cathode of a cathode-coupled phantastron V18 which has its anode voltage initially set by a potentiometer VR2 and a diode V19b. The potentiometer VR2 acts as a range setting device and controls the time before the anode of the phantastron V18 bottoms. During this period the screen grid of the phantastron V18 produces a long positive pulse which is fed via a line L to the suppressor grid of a gate valve V20 which is normally biassed beyond cut off. The received signals from the interrogator receiver Rx2 after amplification and demodulation appear on line N and are applied to the control grid of the gate valve V20 as positive-going pulses, this control grid normally being biassed beyond cut off. Hence, if the received pulse from the receiver Rx2 occurs during the time delay set by the potentiometer VR2 the anode of the gate valve V20 will provide a 20 microsecond negative pulse. This negative-going pulse is fed to a diode V21a which acts as a peak rectifier producing a positive voltage at its cathode except during pulses. This positive voltage leaks slowly away through a diode V21b and the grid leak of a cathode-follower triode V22. However, during a pulse the diode V21b cannot conduct and so the grid of the valve V22 remains positive. If there are no pulses the grid of this valve is biassed negatively and the cathode voltage is zero.

However, if a regular series of pulses is received due to an aircraft being within the chosen range and at the same height, the cathode-follower V22 becomes continuously conducting and the cathode voltage rises to a steady positive value. This change in cathode voltage is used to control main warning apparatus, for example to initiate an exchange of data regarding exact heights, courses and speeds as more particularly described in the said co-pending applications.

It should be understood that the thermionic diodes shown may be replaced by semiconductor diodes if desired.

To sum up, interrogation is made at a frequency X by a pair of pulses separated by a height-coded delay. This interrogation is received at frequency X and the spacing of the pulses is compared with the height coding of the aircraft which has been interrogated. If the two heights are approximately the same a single pulse is sent on frequency Y. The time taken to receive the reply on frequency Y is used by the interrogating aircraft as a measure of the range separating the two aircraft to accept or reject the signals.

FIGURE 2 is a diagrammatic representation of the pulse sequence of the circuit of FIGURE 1.

Referring to FIGURE 2, the positive-going spikes produced at a rate of 100 per second and applied to the phantastron V4 are shown at line *aa*. The phantastron V4 induces a delay of $t_1$ and the positive spikes due to this delay and appearing at the anode of the valve V7*a* are shown at line *bb*. The pair of positive pulses keying the interrogator transmitter are shown at line *cc*.

These positive pulses are received by the responder receiver after a time T as shown in line *dd*. In the responder receiver the phantastron V11 imparts a delay of $t_2$ depending on its own height and as shown at line *ee*. The pulses of line *dd* and line *ee* are passed to the gate valve V15 and if the heights are the same a single pulse output is given as shown at line *ff*. These pulses are transmitted by the responder transmitter and are received by the interrogator receiver after a further time T as shown at line *ii*. The interrogating aircraft now knows that the responding aircraft is at the same height.

For range measurement, the spikes of line *bb* are fed to the phantastron V18 to produce a long pulse as shown at line *hh*. The pulses of lines *hh* and *ii* are fed to the gate valve V20 and if there is coincidence produce pulses as shown at line *jj* for feeding to the valve V22.

Referring now to an alternative system shown in FIGURES 3 and 4 and more particularly to FIGURE 3, the first aircraft generates a pulse, shown on line AA. This pulse is delayed by a time $h$ proportional to the height of the aircraft and appears on line BB. The pulse is again delayed by the same amount and appears on line CC. The interrogator transmitter in the first aircraft now transmits on frequency X (see line XX) the pulses of lines AA, BB and CC. The pulses of lines BB and CC generate gating pulses of a length R which is equal to the time delay for a response from an aircraft at the maximum distance, such gating pulses being shown on line DD.

In the second aircraft, the pulses transmitted on frequency X are received after a time $r$ and each of these three pulses is delayed by a time $h-t$, where $h$ is the height of the second aircraft (assumed to be equal to the height of the first aircraft) and $t$ is a tolerance, these pulses appearing on line FF. The pulses appearing on line FF are widened, as shown on line GG, to pulses of width $2t$, and the latter are used as gating pulses for the pulses on line EE, so that if the second aircraft is at a height corresponding to a delay of approximately $h$ the second and third received pulses of line EE will pass through and will appear on line HH. These pulses are re-transmitted on frequency Y, as shown on line YY.

The interrogator receiver of the first aircraft is switched on by the pulses appearing in line DD and, therefore, if the second aircraft is within the prescribed range the pulses transmitted on frequency Y will be received after a delay of $r$, that is a delay of $2r$ after transmission on frequency X. The received pulses are shown on line II and, after reception, each of these two pulses is delayed by a time $h$ corresponding to the height of the first aircraft and so as to appear on line JJ. The pulses appearing on lines II and JJ are compared and if the pulses received and appearing on line II are in response to an interrogation from the first aircraft then a single pulse will appear on line KK as a coincidence pulse between the second pulse on line II and the first pulse on line JJ.

Hence to sum up, the pulse will only appear on line KK if the second aircraft is at about the same height, is within the prescribed range, and is replying to an interrogation from the first aircraft. The appearance of a pulse on line KK may be used to switch on data exchange apparatus of some suitable form.

Referring now to FIGURE 4 which shows the apparatus for carrying out the pulse sequence of FIGURE 3, it will be seen that the interrogator equipment is shown on the left hand side and the responder equipment on the right hand side, but it will be understood that under normal circumstances an aircraft will have both interrogator and responder equipment.

A pulse generator 1 generates pulses which appear on line AA, the pulse repetition frequency conveniently being of the order of one pulse per two seconds, and the pulse length being of the order of one microsecond. The pulses appearing on line AA are passed via a diode 2 to an interrogator transmitter T$x$1. The pulses are also passed to a first height delay 3 so as to be delayed by a time $h$ and then appear on line BB whence they are passed via diodes 4 and 6 to the transmitter T$x$1. The pulses appearing on line BB are also passed to a second height delay 5 to be again delayed by a time $h$ and are passed via a diode 13 so as to appear on line CC and to be passed via the diode 6 to the transmitter T$x$1. The interrogator transmitter T$x$1 radiates the pulses on a frequency X. A connection is taken from the line CC on which the pulses from the delays 3 and 5 appear to a gating pulse generator 7 from which gate pulses are delivered on a line DD to an interrogator receiver R$x$2.

In the responder, the transmitted pulses on the frequency X are received by a responder receiver R$x$1 and appear on line EE being passed to a height delay 8 set by the height of the responder, the delayed pulses, which are delayed by an amount slightly less than $h$, appearing on line FF and being passed to a pulse widener 9 which delivers relatively wide pulses on a line GG to a coincidence gate 10 which is also fed with pulses from the line EE. As previously explained, if the responder aircraft is at about the same height as the interrogator aircraft, the result will be the appearance of a pair of pulses on a line HH leading from the coincidence gate 10 to a responder transmitter T$x$2 which transmits upon a frequency Y.

If the responder aircraft is within the preset range, the pulses transmitted by the responder transmitter T$x$2 will be received by the interrogator receiver R$x$2 during the time in which it is activated by the gate pulses appearing on the line DD and the pulses will, therefore, appear on a line II. These pulses on the line II are fed to a height delay 11 where they are delayed by the time $h$ to appear on a line JJ and the lines JJ and II are fed directly to a coincidence gate 12. As previously explained, if the responder aircraft is within the preset range and is at substantially the same height and is replying to an interrogation originated by the first aircraft, the result will be the appearance of a single pulse on a line KK leading from the coincidence gate 12, this pulse being used to switch on suitable equipment for the exchange of further data, if desired.

Very desirably there are muting connections so that the responder receiver does not receive interrogations from the interrogator transmitter of its own aircraft.

Any suitable form of height delay may be used for the height delays 3, 5, 8 and 11 and such delays may for example be either in the form illustrated in FIGURE 1, namely phantastrons, or may be delay lines or may be derived from magnetic drums, magnetic tape or the like. It is well known to provide delays of suitable length.

There is a remote possibility that if the pulse repetition frequency is fixed, two aircraft may synchronise their transmissions and accordingly one of the two aircraft may be unaware of the proximity of the other, and whilst the possibility of this occurring is very low, it may be convenient to make the pulse repetition frequency vary slightly in accordance with the course so that only if the two aircraft were upon identical courses would there be any chance of this synchronism occurring and it will be understood that if the aircraft are upon identical courses and remain in proximity for any length of time, the relative speeds must be very low so that visual avoidance of collision is possible and moreover a very long time is required before a collision becomes imminent and consequently a very long time is allowed in which the synchronism may be broken.

To this end therefore, a connection is shown between a compass repeater CR and the pulse generator 1 of FIGURE 4.

Normally this invention will be used to discriminate on the basis of the range between two aircraft, but under certain circumstances it may be desired to measure the range between one aircraft and a station on the ground. Thus if a ground station wishes to know the range to a specific aircraft it will interrogate it and it will, of course, use an interrogation which is based upon the presumed height of this aircraft and thus it should be understood that although the invention has been described with reference to two aircraft, it is contemplated that the invention may operate between a single aircraft and a ground station. The term "station" as used in the claims must be understood to include both aircraft and ground stations.

Moreover, it should also be explained that on occasions an aircraft may wish to know the range of another aircraft which is not at the same height but is at a different height and under such circumstances of course, the first aircraft will interrogate using a height coding suitable for the second aircraft.

In order to reduce possible congestion of the interrogation and response frequencies, it may in practice be desirable to arrange that the frequencies X and Y or either of them may be set in accordance with height.

We claim:

1. Apparatus for the determination of range between first and second stations comprising: for use at the first station, means for generating a first pulse; first time delay means set in accordance with the height of said first station, means passing said first pulse to said first time delay means thereby to generate a second pulse, second time delay means set to provide the same delay as said first time delay means, means passing said second pulse to said second time delay means thereby to generate a third pulse, a transmitter, means passing said first, second and third pulses to said transmitter; for use at the second station, means for receiving said three pulses transmitted by said first station, time delay means set in accordance with the height of the second station, means passing such three received pulses to said time delay means thereby to generate three delayed pulses; coincidence determining means, means passing said three received pulses and said three delayed pulses to said coincidence means thereby to generate two pulses if the heights of said first and second stations are substantially identical, and means for transmitting said two pulses; and, for use at said first station, a receiver for receiving said two pulses transmitted from said second station, third time delay means set in accordance with the maximum range from which signals are to be received, means passing at least said second and third pulses to said third time delay thereby to generate fourth and fifth pulses, means rendering said receiver active only in the period between said second and fourth pulses and in the period between said third and fifth pulses, fourth time delay means set in accordance with the height of the first station, means passing the two received pulses to said fourth time delay thereby to generate sixth and seventh pulses, coincidence determining means, means passing said two received pulses and said sixth and seventh pulses to said coincidence determining means to determine if coincidence exists between the second received pulse and said sixth pulse, and means for indicating such coincidence.

2. The apparatus of claim 1 in which said first pulses are generated as a series, the pulse repetition frequency of which is set in accordance with the course of the first station.

References Cited in the file of this patent

UNITED STATES PATENTS

| 2,554,893 | Brunn | May 29, 1951 |
| 2,595,358 | Herbst | May 6, 1952 |

OTHER REFERENCES

Principles and Practice of Radar by H. E. Penrose and R. S. H. Baulding. Newnes Ltd., London, England, fifth ed. 1955, pages 187–191.